United States Patent [19]

Bennett et al.

[11] 4,345,981

[45] Aug. 24, 1982

[54] ANODICALLY POLARIZED SURFACE FOR BIOFOULING AND SCALE CONTROL

[75] Inventors: John E. Bennett; Joseph E. Elliott, both of Painesville, Ohio

[73] Assignee: Diamond Shamrock Corporation, Dallas, Tex.

[21] Appl. No.: 237,470

[22] Filed: Feb. 23, 1981

Related U.S. Application Data

[63] Continuation-in-part of Ser. No. 963,611, Nov. 24, 1978, Pat. No. 4,256,556.

[51] Int. Cl.$^3$ ................................................ C25B 1/02
[52] U.S. Cl. .................................. 204/129; 204/147; 204/149; 204/DIG. 9
[58] Field of Search ................ 204/147, 149, DIG. 9, 204/129

[56] References Cited

U.S. PATENT DOCUMENTS

| | | | |
|---|---|---|---|
| 1,956,411 | 4/1934 | Bonine | 204/149 |
| 3,503,861 | 3/1970 | Volpe | 204/195 |
| 3,843,507 | 10/1974 | Kwan | 204/149 |
| 4,033,830 | 7/1977 | Fletcher | 204/1 T |
| 4,256,556 | 3/1981 | Bennett et al. | 204/147 |

Primary Examiner—R. L. Andrews
Attorney, Agent, or Firm—John P. Hazzard

[57] ABSTRACT

Biofouling and scale control in conductive aqueous systems is effected on metal, preferably valve metal such as titanium, surfaces on which such fouling normally occurs by applying thereto a stable electrocatalytic coating, anodically polarizing said valve metal coating such that essentially only oxygen is evolved at the surface thereof, preferably at a rate of at least about 4.66 millimoles per square meter per hour without evolution of any chlorine. Periodic current reversal is effected to forestall biofouling upon any cathode utilized in implementing the instant invention.

8 Claims, No Drawings

ANODICALLY POLARIZED SURFACE FOR BIOFOULING AND SCALE CONTROL

CROSS-REFERENCE TO RELATED APPLICATION

This application is a continuation-in-part of U.S. Pat. Application Ser. No. 963,611, filed Nov. 24, 1978, now U.S. Pat. No. 4,256,556.

TECHNICAL FIELD

This invention relates to methods and apparatus for the prevention of scale buildup and biofouling of equipment used in marine environments.

BACKGROUND OF THE INVENTION

Maintaining metallic surfaces immersed in a marine environment clear and free of deposits has long been a universal problem. Metallic surfaces made from valve metal, the so-called "film forming" metals such as titanium, tantalum, zirconium, aluminum, niobium and tungsten are, under most circumstances, quite immune to normal corrosion, and thus such materials are widely used as heat exchange surfaces. However, such surfaces as well as other electroconductive surfaces such as other metals or graphite are vulnerable to biofouling as well as mineral scaling, these deposits interfering with heat transfer, impeding fluid control, corroding the exchanger surface, and the like. Such deposits may be of the alkaline type, such as metal carbonates, or the deposit may be marine growth, such as barnacles, algae and the like. All such deposits, whether they are in a soft, semi-soft, or a hardened condition, must be removed for efficient heat exchange operations. Thus, once the deposits become a problem to heat exchanger operation, the equipment must be shut down and operations terminated until such deposits are removed from the heat exchange surfaces. Various means of removing deposits from metallic surfaces have been employed in the past. Most prominent and still prominent today is the shutting down of such fouled equipment coupled with either mechanically scraping the deposits therefrom or acid washing of the equipment to remove such deposits. Both of these treatments entail significant equipment down-time owing to the necessity for a shutdown of the equipment. Where the deposits are the result of calcium and/or magnesium scale formation, water softeners and conditioners have been used to reduce the formation of scale. However, such means are quite expensive and are often unsuccessful at completely preventing the formation of such scale deposits.

Another method of keeping the surfaces of heat exchanger clear is by continuously subjecting said surface to chlorine or sodium hypochlorite generated in situ. Such treatment can prevent the growth of algae and barnacle formation. Normally, the chlorine is added to the system, although it can be manufactured in situ if the liquid used in the system is capable of passing a current and contains a chloride salt or other chlorine producer. Typical of such systems is an apparatus and method shown and described in U.S. Pat. No. 3,241,512 electrolytically preventing fouling of ship surfaces by the electrolysis of saltwater to produce chlorine gas distributed over the boat hull thereby keeping the hull surface clean while removing and/or preventing growth of barnacles, algae and other foreign and undesirable material. In the '512 patent, copper electrodes are utilized providing some dissolved copper ions in water surrounding the hull which assist in preventing fouling. Other prior art describes similar processes wherein dimensionally stable anodes are used for producing the chlorine in situ to prevent fouling.

BRIEF SUMMARY OF THE INVENTION

The essence of the instant invention is the electrolysis of water at the appropriate voltages and current to produce a requisite amount of oxygen and hydrogen ions per unit time to prevent deposit formation on a metal surface, the voltages being insufficient to electrolyze any salt present in the electrolyte thereby avoiding formation of chlorine gas. The hydrogen ion produced by the electrolysis, along with possible nascent oxygen, continuously effects a skin layer of acidic electrolyte and is effective in preventing deposition of hardness scale as well as biofouling. When the metallic surface to be protected is a valve metal, such as titanium, the surface is coated with a stable electrocatalytic coating which is capable, at extremely low current density and voltages, of producing an effective quantity of oxygen and hydrogen ions to prevent hardness scale and/or biofouling.

The protected metallic surface is generally made anodic with respect to a second electroconductive surface. In a hardness and biological deposit forming aqueous environment, operation of one electroconductive surface electrically cathodic to the other results eventually in a buildup of hardness and, likely, biological deposits upon the more cathodic surface. Periodic reversal of the anode and cathode roles between the surfaces functions to keep both surfaces clear of deposits. Where the second electroconductive surface also includes an electrocatalytic surface portion or coating or where the second electroconductive surface presents conditions for the ready formation of oxygen and hydrogen ions at a voltage below the voltage usually associated with chlorine production, then biological deposits upon both surfaces can be suppressed by such current reversal.

DETAILED DESCRIPTION OF THE INVENTION

The instant invention provides a method and apparatus for the prevention of both biological growth and hardness scale on metallic surfaces without the generation of toxic chemicals such as chlorine gas which can damage life forms in the ocean environment while at the same time avoiding dissolution of toxic metallic ions to the aqueous environment. The invention, therefore, has great utility in processes where seawater is utilized in large quantities and returned to the ocean, although the present invention can also be utilized in non-saline situations such as multi-effect evaporators where hardness scale is of prime consideration. For ease of description, however, the instant invention will be described with respect to its application in a seawater environment, although seawater is not a necessity in the broadest sense in the instant invention.

The essence of the instant invention is to prevent marine growth and/or hardness scale on a metallic surface. This is accomplished by making the metallic surface anodic for electrolyzing water present around the metallic surface. This electrolysis evolves oxygen and hydrogen ions to prevent marine growth as well as hardness scale caused by calcium and magnesium compounds found in the water. A certain amount of evolution of oxygen and hydrogen is required to suppress these deposits. The anodic electrochemical reaction under these circumstances is as follows:

$$2H_2O \rightarrow O_2 + 4H^+ + 4e^-$$

Four moles of hydrogen ions are generated for every mole of oxygen which is evolved. This hydrogen ion generation creates a low pH layer in the water immediately adjacent the metallic surface. This acidic layer, possibly together with the nascent oxygen, is believed to be responsible for the prevention of mineral and biological buildup on the anodic surface. It is effectively impossible to measure the actual pH of this region of high acidity, since the region is extremely thin. However, indirect voltage measurements imply that the pH is in a range of approximately 1 to 3.

Numerous tests have demonstrated that biofouling and hardness scale can be prevented at low current and voltage levels merely by the evolution of oxygen and hydrogen ions by water electrolysis without any chlorine generation. The ratio of oxygen and hydrogen ions produced by the water electrolysis is fixed by the water electrolysis equation, but the amount of oxygen and hydrogen required to effect mineral and biological deposit suppression can vary broadly depending on a number of variables associated with the particular metallic surface system to be protected from hardness scale and/or biofouling. Such variables include salinity of the electrolyte, hardness content of aqueous electrolyte surrounding the metallic surface, temperature of the electrolyte, flow rate of the electrolyte, bioactivity occuring in the electrolyte, and geometry of the system.

To keep a surface clean without generating toxic chemicals such as $Cl_2$, the metallic surface must be maintained at a voltage less anodic than a half cell potential causing generation of chlorine in the particular metallic surface-electrolyte system involved. For a seawater electrolyte, this potential is about 1.375 volts vs. Normal Hydrogen Electrode (NHE) (1.133 volts vs. Saturated Calomel Electrode (SCE)). For less saline solutions and particularly for solutions containing less chloride ions, this threshold anodic potential at which chlorine is produced becomes somewhat greater. Thus, in the practice of the present invention, the anodic half cell potential level must be at or below a threshold for the electrolyte where chlorine first would be evolved. For convenience, this half cell potential is hereinafter referred to as a threshold voltage.

In addition, sufficient oxygen must be generated at a voltage below the chlorine threshold voltage to effectively prevent biological growth and/or hardness scale. The amount of oxygen evolution under given voltage conditions will depend on the current flowing and, importantly, the capability of the anodic metal surface for catalyzing oxygen evolution. While lesser amounts of oxygen evolution are effective in controlling hardness scale and biofouling under the less stringent conditions for scale and biofoulant formation, the preferred rate of oxygen evolution is about at least 4.66 millimoles $O_2$ per square meter hour for adequate protection over widely varying conditions. Most preferably, 10.0 millimoles $O_2$ or more per square metal hour are evolved under the more stringent scale and biofoulant formation conditions.

Not all metallic surfaces are effective in the practice of the instant invention since, for many, chlorine is generated before sufficient oxygen generation is effected. Thus, in order to successfully practice the instant invention on equipment having metallic surfaces to be protected, a stable electrocatalytic coating is applied to the metallic surface. The coating catalyzes oxygen evolution at the selected voltage below the threshold voltage for the system for chlorine evolution when the metallic surface is made anodic.

The stable electrocatalytic coating is selected from a group generally consisting of platinum group metals, alloys, platinum group metal oxides or mixtures thereof. The platinum group comprises platinum, palladium, osmium, iridium, ruthenium and rhodium. Ruthenium, iridium and their oxides are the preferred coating. Metal coatings of platinum and palladium are inoperative in the practice of the instant invention since chlorine is generated at least before sufficient quantities of oxygen per unit time are generated sufficient to practice the instant invention. Coatings of rhenium metal or alloys of rhenium and palladium, while functional, are marginal in the practice of the instant invention. While they are operable, the control of voltage and current must be extremely accurate in order to produce sufficient oxygen per unit time without significant evolution of chlorine.

Among the metal oxide coatings useful in the present invention are the so-called Beer coatings such as are described in U.S. Pat. No. 3,632,498. These Beer coatings consist of a film-forming oxide and a platinum group oxide. Among the preferred coatings of the Beer type is one which utilized a mixture of titanium dioxide and ruthenium dioxide.

Other stable anodic coatings useful in the present invention are those described in Beer U.S. Pat. Nos. 3,751,296; 3,853,739; 3,855,092; and 4,005,003. The coatings described in these cited patents are non-passivating and electrocatalytic when used for oxygen production in saltwater environments. These cited patents also disclose various methods for applying the catalytic coating to a metallic surface. In practicing the present invention, the metallic surface preferably is a film-forming metal, most preferably titanium. Film-forming metals also include aluminum, tantalum, zirconium, bismouth, tungsten, niobium and alloys. Although a wide variety of catalytic coatings can be used in the present invention and will evolve oxygen, it is necessary to pick a catalytic coating which is operable for oxygen evolution at a voltage below the voltage at which chlorine is first evolved in the system and at the same time be capable of producing sufficient oxygen, preferably 4.66 millimoles of oxygen or more, per square meter hour of electrocatalytic coated surface area.

As stated earlier, the electrocatalytic stable coating known also as a dimensionally stable coating may be applied in the various manners described in the cited patents as well as by methods obvious to those skilled in the art. One method of applying the coatings useful in the practice of the present invention particularly as to heat exchangers is to apply a coating solution to the metallic surface, whether it be an interior or exterior surface of a structure, followed by resistance heating of the metallic surfaced substance to an appropriate temperature using AC current. Where the metallic surface substance is a valve metal, the substance is its own resistance heater and generates sufficient heat on the application of alternating current to oxidize the coating solution applied to the surface of the valve metal.

When coating, for example, tube bundles or other more difficult shapes, it should be borne in mind that areas near welds are more difficult to coat properly. In tube bundles where welds appear at the entrance and exit of the bundle, this problem is critical, since biological fouling is often worse at the entry and exit of such tubes. In such cases, it is preferable to assure that these weld or other areas are properly coated. It is therefore preferable to apply a second or precautionary coating in these areas followed by a flame brushing of such areas to oxidize the coating material.

One prime utility of the instant invention appears to be in maintaining heat exchange surfaces clear and free of biological and hardness deposits to sustain highly efficient heat exchange characteristics. The anodic dimensionally stable coatings applied to the heat exchange surfaces in practicing the instant invention are extremely thin and do not interfere significantly with heat exchange properties of the system except for maintaining heat exchange efficiency by preventing the buildup of biological or hardness deposits on the heat exchange surface. While the practice of the instant invention is not detrimental to heat exchange properties, it has been observed on a number of occasions that practicing the method of this invention improves (about 10 percent) the heat exchange properties of a given exchanger system perhaps due to a film effect associated with liquid flowing through the heat exchanger being disrupted by the oxygen evolution on the anodic surface thereby leading to better heat transfer characteristics.

In many applications, maintenance of the surface to be protected from biological fouling and/or hardness deposits in a continuously anodic state is not required. The surface to be protected must be anodic only for a portion of any time period depending on the configuration of a particular heat exchange system, the degree of contamination of the cooling fluid, the temperature, and the like. In these instances, mere interrupting the anodic polarity over varying time spans suffices as, for example, by making such a metallic surface anodic every 4 hours for a period of time sufficient to remove and/or prevent buildup of biological or hardness deposits. Likewise, the surface to be protected can be rapidly made anodic and released to a non-polarized state several times per second should contamination aspects of the cooling fluid or medium demand. Since the current utilized in the practice of the invention is extremely small, in some cases, particularly where cathodes are consumed or replaced from time to time, there is little difficulty with leaving the surface to be protected anodic at all times. However, economics and other constraints in a given application may dictate otherwise.

One such other constraint centers about whatever source is utilized for making the metallic surface anodic. Generally the metallic surface is made anodic to an electroconductive surface or cathode by operation of a voltage/current source. The cathode, by necessity, is exposed to the same electrolyte or fluid, and consequently many of the same biofouling and mineral deposit hazards as the anodic metallic surface.

To prevent accumulation of mineral deposits upon this second electroconductive surface or cathode, it is desirable to periodically reverse polarity between the surfaces so that the second electroconductor becomes anodic and the anodic metallic surface becomes cathodic. Thus suppression of mineral deposits and biofouling at both surfaces is implementable through periodic current reversal thereby periodically evolving oxygen and hydrogen at each surface.

Each surface, the original anodic metallic surface and the second electroconductive surface or cathode, can be coated with the electrocatalytic material. The coating then provides the selectively oxygen generating properties necessary to provide a sufficient water electrolysis rate without formation of chlorine where the metallic surface or electroconductive surface alone otherwise does not.

Reversal of current can be effected as frequently as necessary to maintain each surface substantially free of both mineral and biological deposits. For typical applications such as non-heated applications like seawater intake screens, it has been found that making the surfaces anodic for successive ½-hour periods followed by a 3-hour period during which no potential exists between the surfaces will often be satisfactory for suppressing deposits. For heated surfaces, the period of no potential and frequency of current reversal are highly dependent upon operating conditions. Under particularly severe conditions, maintenance of continuous electrical potential between the surfaces with reversals as often as each hour may be necessary.

Particularly, one utility foreseen for the instant invention is in maintaining heat exchange surfaces free of biological and/or hardness deposits interfering with heat transfer characteristics of the exchanger surface. Among the specific uses of the instant invention would be in the maintenance of heat exchange surfaces at coastal power stations or in shipboard heat exchangers where seawater is utilized as the cooling medium. In such heat exchangers, titanium is often the material selected for construction of the heat exchangers, a choice related to the seawater corrosion resistance of titanium. Another significant potential usage for the instant invention is in so-called Ocean Thermal Energy Conversion (OTEC) plants. The plant is one of several options being investigated by the Department of Energy to utilize effectively solar energy. Basically, the OTEC plant concept involves using a temperature difference between the warm surface water of tropical oceans and deeper, colder water to operate a heat engine. It has been estimated that 4 to 6 percent of the anticipated energy needs of the U.S. could be supplied by this concept by the year 2020. Such systems require large heat exchange surfaces, Titanium appears to be the material of choice for constructing these heat exchange systems. Conventional methods which might be used to prevent biofouling of OTEC plants are very limited. The use of chlorine and other biocides is not feasible due to the enormous flow of seawater involved. Also, the environmental effect of such correspondingly large quantities of free chlorine or other biocides in the open ocean may be significant and possibly highly detrimental to the ocean life in the vicinity of such as OTEC plant.

Another area of use for the instant invention is in multi-stage flash evaporators used for desalination of water. Desalination multi-stage flash evaporators are currently made of titanium and require antifouling techniques to prevent buildup of biological and hardness deposits thereby maintaining heat transfer characteristics. Presently presistant fouling of such heat exchange surface in these evaporators with magnesium and calcium scale demands the use of significant vacuum to reduce the boiling point temperature of evaporator contents, resulting in high capital costs to minimize hardness deposits. In many cases, acid is continuously added to seawater feed to maintain a pH to 5. Even with such a precaution, the formation of hardness scale in these evaporators dictates frequent shutdowns for acid and mechanical cleaning resulting in high maintenance costs. Using the instant invention, the heat exchange surfaces can be maintained clear of deposits allowing equipment designs operating at higher temperatures and correspondingly greater heat transfer efficiency thereby significantly reducing capital costs associated with equipment for allowing atmospheric pressure operation.

Another foreseeable use for the instant invention is in relation to geothermal power. Geothermal power plants are subject to extreme conditions of corrosion and fouling. Titanium heat exchangers are used virtually exclusively and are subjected to conditions promoting severe hardness scaling. Use of the instant invention in geothermal power plant related heat exchangers can provide sufficient acidity at the heat exchange surface to forestall hardness deposits thereon.

The following examples illustrate the practice of the present invention and also defines a lower limit of effective protection when using seawater as found in the Fort Lauderdale, Florida, area (i.e., seawater containing salt and other dissolved solids such that the voltage at which chlorine is given off is about 1.136 volts versus SCE).

EXAMPLE I

A series of 10 centimeter square titanium test panels were coated with a stable anodic coating in the following manner. A master coating solution was prepared as follows:

| | |
|---|---|
| $RuCl_3.2.5H_2O$ (38.6% Ru) | 1.192 gm. |
| $SnCl_2$ (anhydrous) | 574 gm. |
| Butyl titanate (14.3% Ti) | 5.580 ml. |
| HCl (35%) | 760 ml. |
| Butanol | 11.220 ml. |

The solution was prepared by partially dissolving the tin and ruthenium salts in the HCl and adding the butanol. After stirring until the salts dissolve, the butyl titanate was added, and the solution was again stirred to ensure complete intermixing. Analysis of the solution gives the following composition in grams per liter: Ru 25.5, Ti 44.3 and Sn 20. This represented a $TiO_2$:$(RuO_2+SnO_2)$ mole ratio of 2.2:1 and 40.0 mole percent of $SnO_2$ in $(RuO_2+SnO_2)$.

A portion of this master solution was applied to the titanium panels and the thus-coated titanium was heated in air to a temperature of 450° C. for 7 minutes. This procedure was repeated 10 more times to result in a final coating weight of 1/5 grams per square foot of anode surface on a $(RuO_2+SnO_2)$ basis.

Anodes prepared according to the foregoing were then installed at a seawater intake off Fort Lauderdale, Florida, below the water surface. Six such coated test panels were placed below the water surface and five were made anodic utilizing different current densities on each of five panels. The sixth panel was not made anodic and functioned merely as a control. After five months on-line, the results were as given in the following table.

TABLE I

| Panel Number | $A/m^2$ | Millimoles Oxygen Per Square Meter Hour Evolved | Surface Fouling |
|---|---|---|---|
| 1 | 10 | 93.2 | None |
| 2 | 3 | 27.96 | None |
| 3 | 1 | 9.32 | Slight edge growth only |

TABLE I-continued

| Panel Number | $A/m^2$ | Millimoles Oxygen Per Square Meter Hour Evolved | Surface Fouling |
|---|---|---|---|
| 4 | 0.3 | 2.80 | Small amount |
| 5 | 0.1 | 0.93 | Completely covered |
| Control | 0 | 0 | Completely covered |

EXAMPLE II

Three test panels were prepared in accordance with Example I. The panels were contained in a plastic housing through which seawater drawn from off Ft. Lauderdale, Fla., was flowed on a once through basis. The plates were alternately made anodic and cathodic at a current density of 0.1 amps/meter squared for periods of 12 hours. After 67 days on line, the test panels were free of both mineral and biological deposits.

EXAMPLE III

Other sets of 3 panels were prepared in accordance with Example I an contained in plastic housings through which circulated seawater drawn from off Ft. Lauderdale, Fla., was flowed on a once through basis. Table II summarizes the results.

TABLE II

| Test No. | Current Density $A/m^2$ | Cycle Time | Days on Line | Observations |
|---|---|---|---|---|
| 11 | 10.0 | 3 days | 16 | No biofouling - slight scaling |
| 12 | 10.0 | 1 hour | 10 | Clean. |
| 13 | 1.0 | 12 hours | 44 | No biofouling or scale. |
| 14 | 0.5 | 12 hours | 198 | No biofouling or scale. |
| 15 | 0.5 | 3 days | 11 | Biofouling on all surfaces. No barnacles. |
| 18 | 0.1 | 12 hours | 67 | All surfaces clean. |
| 19 | 0.1 | 1 hour | 14 | Clean. |
| 111 | 1.0 | None | 241 | No biofouling on anode. Heavy scale on cathode. |
| 112 | Control | None | 36 | All surfaces biofouled; ~5 barnacles per plate. |
| 114 | 0.5 | 1 hr. on 1 hr. off ½ hr. each as cathode and anode | 19 | Clean. |
| 116 | 0.5 | 1 hr. on 4 hrs. off ½ hr. each as cathode and anode | 18 | Clean. |
| 117 | Control | | 17 | Thin film. |

By reference to Tables I and II, it may be seen that utilizing current reversal, substantially improved biofouling protection is available at low current densities such as 0.1 amps/meter$^2$, and significantly improved biofouling protection is available at current densities of 1.0 amp/meter$^2$ or less.

At low current densities, current reversal on a frequency of less than about every 3 days is preferred in providing biofouling protection with a period of 1 to about 24 hours being most preferred. It has been found that frequent reversals, those of every 4 hours or less, may contribute to an early exhaustion of an electrocatalytic coating applied to the electrode surfaces.

It should be understood that rates of biofouling and scale formation are to a large extent dictated by ambient conditions such as temperatures of the water, mineral hardness, and bio-nutrients available. Therefore, appropriate current density and frequency of reversal are necessarily determined with due regard to the factors influencing biofouling.

While a preferred embodiment of the invention has been described in detail, it will be apparent that various modifications or alterations may be made therein without departing from the spirit and scope of the invention as set forth in the appended claims.

What is claimed is:

1. A method of maintaining an electrocatalytic electroconductive surface free of at least one of biological and hardness deposits in an aqueous environment containing chloride ions, said electrocatalytic, electroconductive surface being for generating an effective amount of oxygen to maintain said surface free of biological and hardness deposits with substantially no evolution of chlorine gas when made anodic, comprising: making said electrocatalytic surface anodic to a second electroconductive surface whereby water in contact with the electrocatalytic surface is electrolyzed to produce sufficient oxygen and hydrogen ions at said anodic electrocatalytic surface to prevent formation of biological or hardness deposits without the evolution of chlorine, and periodically making the second electroconductive surface anodic to the electrocatalytic surface to effect a removal of at least hardness deposits on the second electroconductive surface.

2. A method of maintaining an electrocatalytic electroconductive surface free of at least one of biological and hardness deposits in sodium chloride containing aqueous environment, said electrocatalytic, electroconductive surface being one generating an effective amount of oxygen to maintain said surface free of biological and hardness deposits with substantially no evolution of chlorine gas when made anodic, comprising: making said electrocatalytic surface anodic to a second electroconductive surface whereby water in contact with the electrocatalytic surface is electrolyzed to produce oxygen and hydrogen ions at said anodic electrocatalytic surface to in a quantity effectively preventing formation of biological or hardness deposits thereon, the electrolysis taking place at an applied voltage below a threshold voltage at which chlorine is evolved, and periodically making the second electroconductive surface anodic to the electrocatalytic surface to effect a removal of at least hardness deposits on the second electroconductive surface.

3. A method of maintaining a valve metal surface free of at least one of biological and hardness deposits in an aqueous environment containing chloride ions comprising: applying to the surface of said valve metal a stable electrocatalytic coating for generating an effective amount of oxygen for maintaining the electrocatalytic surface free of biological and hardness deposits with substantially no evolution of chlorine gas when the surface is made anodic; and thereafter, with the coated valve metal surface in the aqueous chloride ion containing environment, rendering the coated valve metal surface anodic to a second electroconductive surface and passing current between the surfaces thereby generating oxygen at a rate per square meter of coated valve metal surface area per hour to effectively prevent formation of hardness and biological deposits with substantially no chlorine gas being generated; and periodically making the second electroconductive surface anodic to the coated surface to effect a removal of at least hardness deposits on the second electroconductive surface.

4. A method of maintaining a valve metal heat exchange surface free of heat exchange interfering deposits in an aqueous environment containing chloride ions comprising: applying to the valve metal heat exchange surface a surface stable electrocatalytic coating, said coating being of a type generating a quantity of oxygen per square meter of coating surface area per hour through the electrolysis of water with evolution of substantially no chlorine gas to effectively maintain the surface free of biological and hardness deposits; and thereafter, when the coated heat exchange surface is in the aqueous environment, rendering said coated heat exchange surface anodic to a second electroconductive surface and passing a current between the surface generating an amount of oxygen per square meter of coated heat exchange surface area per hour effective to prevent accumulation of hardness and biological deposits while generating substantially no chlorine gas, and periodically making the second electroconductive surface anodic to the coated surface to effect a removal of at least hardness deposits upon the second electroconductive surface.

5. A method of maintaining a valve metal heat exchange surface free of heat exchange interfering deposits of biological origin and hardness scale when in contact with saltwater containing chloride ions comprising: applying to the valve metal heat exchange surface a stable electrocatalytic coating, the coating anodically generating a quantity of oxygen per square meter of coating surface area per hour through the electrolysis of water with evolution of substantially no chlorine gas effective to maintain the surface substantially free from biological and hardness deposits; and thereafter, when the coated valve metal heat exchange surface is in contact with saltwater, rendering the coated valve metal heat exchange surface anodic to a second electroconductive surface and passing a current between the surfaces to generate an oxygen per square meter of coated valve metal heat exchange surface area per hour effective to prevent accumulation of hardness and biological deposits thereof while generating substantially no chlorine gas, and periodically making the second electroconductive surface anodic to the coated surface to effect a removal of at least hardness deposits upon the second electroconductive surface.

6. The method of any of claims 3, 4 and 5 wherein the coating on the valve metal is selected from a group consisting of iridium, ruthenium, rhenium, rhodium, delta manganese dioxide, platinum group metal alloys containing iridium, rhenium, ruthenium or rhodium, and mixtures containing at least one platinum group metal oxide and at least one valve metal oxide.

7. The method of any of claims 1, 2, 3, 4 and 5 wherein the second electroconductive surface is an electrocatalytic surface, the electrocatalytic surfaces being made alternately anodic one to the other.

8. The method of any of claims 1, 2, 3, 4 and 5 wherein the electrical current flowing between anodic and cathodic surfaces is periodically interrupted.

* * * * *